United States Patent
Sano et al.

(10) Patent No.: US 12,125,238 B2
(45) Date of Patent: Oct. 22, 2024

(54) INFORMATION PROCESSING DEVICE, INFORMATION PROCESSING METHOD, AND COMPUTER PROGRAM PRODUCT

(71) Applicant: KABUSHIKI KAISHA TOSHIBA, Tokyo (JP)

(72) Inventors: Yuma Sano, Setagaya Tokyo (JP); Ryo Nakashima, Kawasaki Kanagawa (JP); Masako Kashiwagi, Ageo Saitama (JP); Nao Mishima, Inagi Tokyo (JP); Akihito Seki, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 415 days.

(21) Appl. No.: 17/465,225

(22) Filed: Sep. 2, 2021

(65) Prior Publication Data

US 2022/0215576 A1 Jul. 7, 2022

(30) Foreign Application Priority Data

Jan. 4, 2021 (JP) .................................. 2021-000253

(51) Int. Cl.
*G06T 7/73* (2017.01)
*G06T 7/55* (2017.01)

(52) U.S. Cl.
CPC . *G06T 7/74* (2017.01); *G06T 7/55* (2017.01)

(58) Field of Classification Search
CPC  G06T 7/74; G06T 7/55; G06T 19/006; G06T 7/50; G01C 21/206; G01C 21/32; G01C 21/00; G06N 3/02
See application file for complete search history.

(56) References Cited

U.S. PATENT DOCUMENTS 8,878,773 B1 * 11/2014 Bozarth ............... G06V 10/143
382/103
10,026,218 B1 * 7/2018 Mertens ............... H04N 13/332
(Continued)

FOREIGN PATENT DOCUMENTS

CN 110702111 A * 1/2020 ............. G01C 21/16
JP 5707238 B2 4/2015
(Continued)

OTHER PUBLICATIONS

Carvalho, M., et al (2019). Deep Depth from Defocus: How Can Defocus Blur Improve 3D Estimation Using Dense Neural Networks?. In: Leal-Taixé, L., Roth, S. (eds) Computer Vision—ECCV 2018 Workshops. ECCV 2018. Lecture Notes in Computer Science( ), vol. 11129. (Year: 2019).*

(Continued)

*Primary Examiner* — Vu Le
*Assistant Examiner* — Jack Peter Kraynak
(74) *Attorney, Agent, or Firm* — Holtz, Holtz & Volek PC

(57) ABSTRACT

According to an embodiment, an information processing device is configured to: estimate, based on target image data, target position data representing an image-capturing position at which the target image data is captured; estimate, based on the target image data, target depth data representing a distance to an object from the image-capturing position; register new image-capturing information including the target image data, the target position data, and the target depth data; display, on a display device, map data representing a map of an environment in which the image data is captured; and display at least one of image data and depth data included in designated image-capturing information that is designated from among a plurality of pieces of image-capturing information, in association with a pixel position in the map data, the pixel position corresponding to position (Continued)

data included in the designated image-capturing information.

16 Claims, 14 Drawing Sheets

(56) References Cited

U.S. PATENT DOCUMENTS

| | | | |
|---|---|---|---|
| 10,678,259 B1* | 6/2020 | Ferguson | G06T 7/254 |
| 11,274,929 B1* | 3/2022 | Afrouzi | G01C 21/165 |
| 11,348,269 B1* | 5/2022 | Ebrahimi Afrouzi | A47L 11/4025 |
| 2015/0254499 A1* | 9/2015 | Pang | G06V 20/647 |
| | | | 382/103 |
| 2016/0117860 A1* | 4/2016 | Fei | G06F 3/017 |
| | | | 345/419 |
| 2016/0292533 A1* | 10/2016 | Uchiyama | G06T 7/55 |
| 2018/0143024 A1* | 5/2018 | Kay | H04W 4/029 |
| 2018/0302614 A1* | 10/2018 | Toksvig | G06T 5/50 |
| 2020/0116493 A1* | 4/2020 | Colburn | G06F 18/253 |
| 2020/0294260 A1 | 9/2020 | Kashiwagi et al. | |
| 2020/0302510 A1* | 9/2020 | Chachek | G06Q 30/0639 |
| 2021/0279908 A1 | 9/2021 | Nakashima et al. | |
| 2022/0004816 A1 | 1/2022 | Sakurai et al. | |

FOREIGN PATENT DOCUMENTS

| | | | |
|---|---|---|---|
| JP | 2017102672 A | 6/2017 | |
| JP | 2020080147 A | 5/2020 | |
| JP | 2020098568 A | 6/2020 | |
| JP | 2020148483 A | 9/2020 | |
| JP | 2021140317 A | 9/2021 | |
| JP | 2022014334 A | 1/2022 | |
| WO | WO-2016069499 A1 * | 5/2016 | G01C 19/5776 |

OTHER PUBLICATIONS

Kashiwagi, et al., "Deep Depth from Aberration Map", 2019 IEEE/CVF International Conference on Computer Vision (ICCV), IEEE, Oct. 27-Nov. 2, 2019, pp. 4069-4078.
Nakashima, et al., "SIR-Net: Scene-Independent End-to-End Trainable Visual Relocalizer", 2019 International Conference on 3D Imaging, Modeling, Processing, Visualization and Transmission (3DIMPVT), IEEE, Sep. 16-19, 2019, pp. 472-481.

* cited by examiner

FIG.2

| ID | DATE AND TIME DATA | IMAGE DATA | POSITION DATA | ORIENTATION DATA | DEPTH DATA | CAMERA PARAMETER |
|---|---|---|---|---|---|---|
| #001 | | | | | | |
| #002 | | | | | | |
| #003 | | | | | | |
| ... | | | | | | |

FIG.10
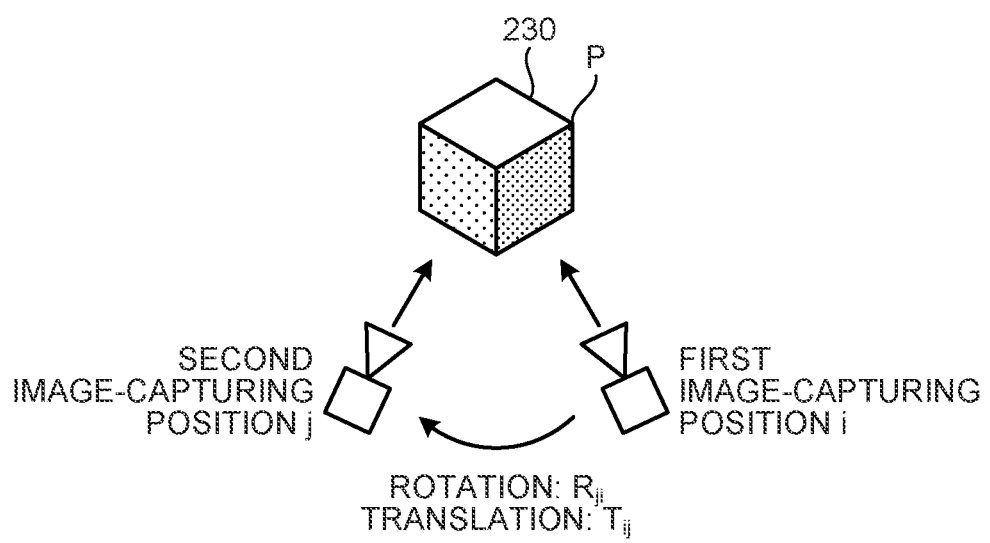
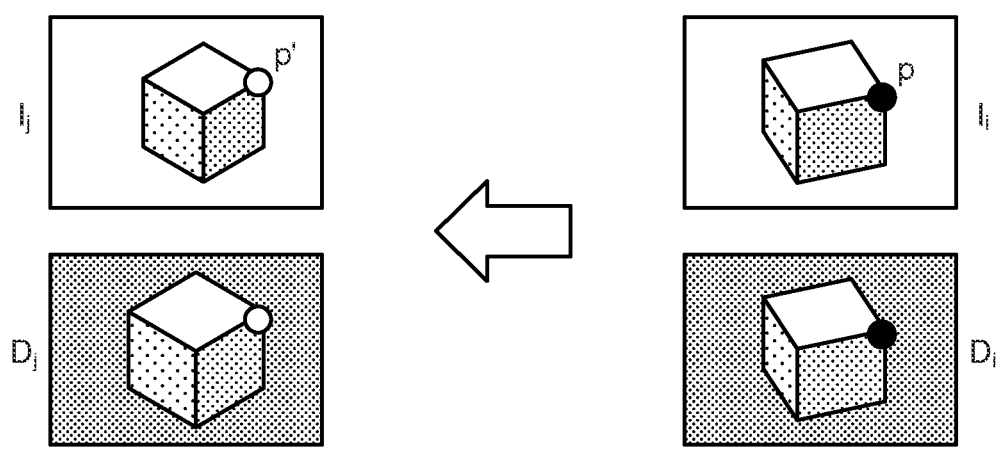

INFORMATION PROCESSING DEVICE, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2021-000253, filed on Jan. 4, 2021; the entire contents of which are incorporated herein by reference.

FIELD

Embodiments described herein generally relate to an information processing device, an information processing method, and a computer program product.

BACKGROUND

The state of the interior of a social infrastructure, such as a tunnel, the interior of a building, or equipment therein has been inspected using a large amount of image data obtained by capturing images of the building, the interior of the social infrastructure, or the interior of the building with cameras. However, when performing such an inspection operation in an indoor environment where a positioning system such as the global positioning system (GPS) cannot be used, the inspector has to input the image-capturing position for each piece of the large amount of image data.

Furthermore, in such an inspection operation, the inspector has to compare image data obtained by capturing an inspection target with image data obtained by capturing the same inspection target at a different time. For this reason, the operator has to visually select and check image data obtained by capturing the same inspection target at different times from a large amount of image data, resulting in the operation being time-consuming and cumbersome.

BRIEF DESCRIPTION OF THE DRAWINGS

FIG. 2 is a diagram illustrating the contents of information stored in a first database;

FIG. 10 is a diagram for illustrating viewpoint conversion processing;

DETAILED DESCRIPTION

Figure 1:
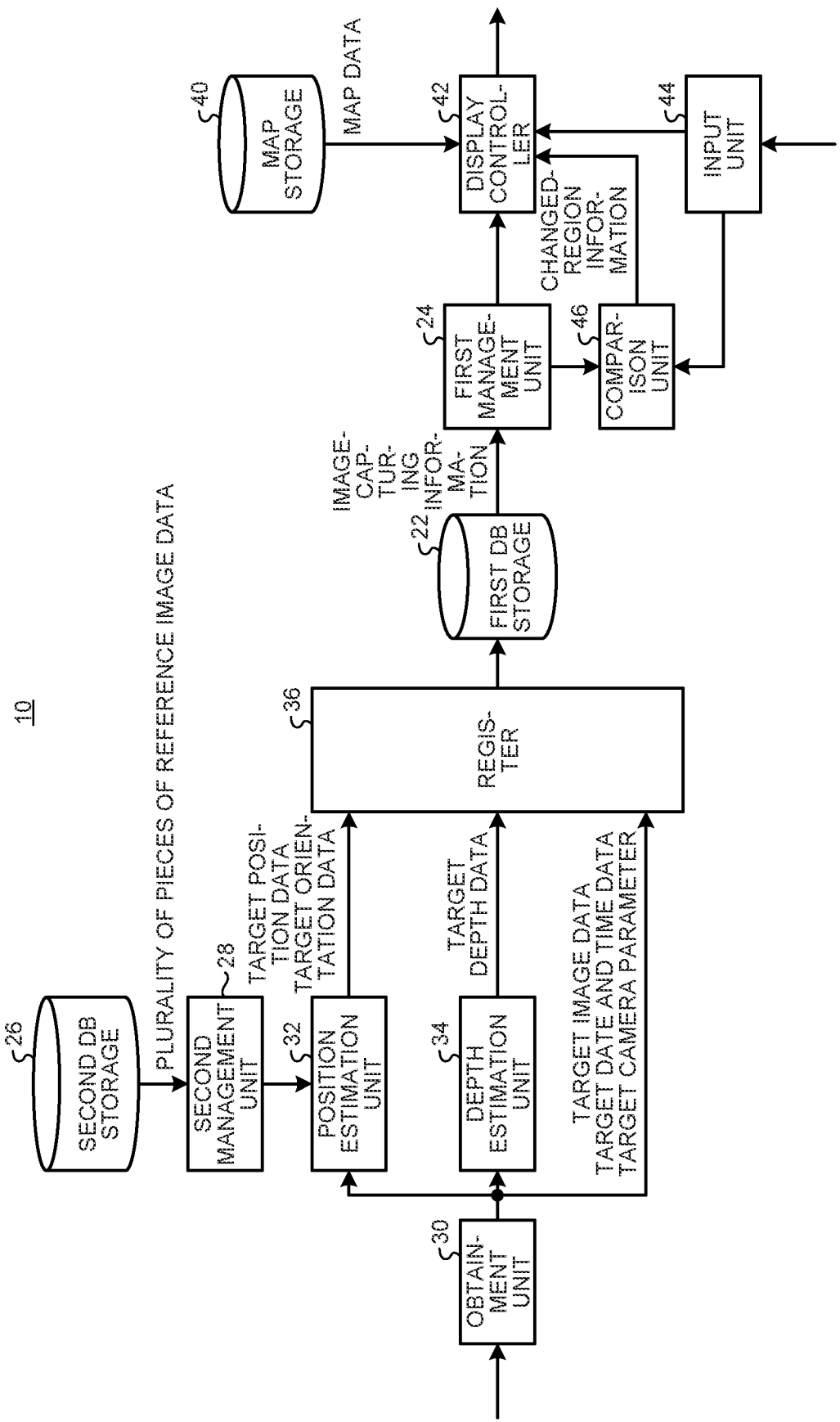
FIG. 1 is a diagram of the functional configuration of an information processing device according to an embodiment.

According to an embodiment, an information processing device includes a hardware processor configured to: manage a first database that stores therein a plurality of pieces of image-capturing information, the image-capturing information each including image data, position data, and depth data, the position data representing an image-capturing position at which the image data is captured, the depth data representing a distance to an object from the image-capturing position represented by the position data; obtain target image data; estimate, based on the target image data, target position data, the target position data representing an image-capturing position at which the target image data is captured; estimate, based on the target image data, target depth data, the target depth data representing a distance to an object from the image-capturing position represented by the target position data; register new image-capturing information including the target image data, the target position data, and the target depth data, in the first database; and display, on a display device, map data representing a map of an environment in which the image data is captured. The hardware processor is configured to display at least one of the image data and the depth data in association with a pixel position in the map data, the image data and the depth data being included in designated image-capturing information, the designated image-capturing information being designated from among the plurality of pieces of image-capturing information stored in the first database, the pixel position corresponding to the position data included in the designated image-capturing information.

Referring to the drawings, an information processing device 10 according to an embodiment is now described.

The information processing device 10 obtains a plurality of pieces of image data obtained by capturing each of a plurality of objects to be inspected with a camera. The objects to be inspected may be an interior part of a building such as a social infrastructure, a plant, or a factory, and equipment provided therein, for example. The information processing device 10 displays, on a display device, information for determining the state of deterioration or the like of each of the objects based on the obtained image data.

FIG. 1 is a diagram illustrating the functional configuration of the information processing device 10. FIG. 2 is a diagram illustrating the contents of information stored in a first database.

The information processing device 10 is a server on a network, a dedicated or general-purpose computer, or the like. The information processing device 10 has the functional configuration illustrated in FIG. 1 when executing a computer program. That is, the information processing device 10 includes a first DB storage 22, a first management unit 24, a second DB storage 26, a second management unit 28, an obtainment unit 30, a position estimation unit 32, a depth estimation unit 34, a register 36, a map storage 40, a display controller 42, an input unit 44, and a comparison unit 46.

The first DB storage 22 stores therein the first database. The first DB storage 22 may be implemented by a server or a cloud external to the information processing device 10.

As illustrated in FIG. 2, the first database stores therein a plurality of pieces of image-capturing information. Each of the pieces of image-capturing information includes ID, date and time data, image data, position data, orientation data, depth data, and camera parameters.

The ID is information for identifying the image-capturing information. The date and time data is information representing the date and time at which the image data is captured. The image data represents a two-dimensional image captured with a monocular camera. In the present embodiment, the image data is data of a color image.

The position data represents the image-capturing position at which the image data is captured. The image-capturing position represents the position of a three-dimensional point in real space. For example, the image-capturing position may be information represented by latitude, longitude, and altitude, or may be represented by distances in the X, Y, and Z directions with any reference position as the origin. The X, Y, and Z directions are orthogonal to one another in real space.

The orientation data represents the image-capturing orientation of the camera with which the image data is captured. The image-capturing orientation represents the direction from the image-capturing position to the object at the center of the image in real space. For example, the image-capturing orientation may be information represented by an azimuth, or may be represented by horizontal and vertical angles from any reference direction.

The depth data represents the distance from the image-capturing position, which is represented by the position data, to the object included in the image data. The depth data is data having the same angle of view as that of the image data.

The camera parameters include a plurality of parameters used when the camera captures the image data. In this embodiment, the camera parameters include a focal length and the image center. That is, the camera parameters include parameters that enable the conversion between image coordinates and camera coordinates.

The first management unit 24 manages the first database stored in the first DB storage 22. For example, the first management unit 24 manages access to the first database. For example, the first management 24 may obtain, from the first database, one or more pieces of image-capturing information that match the designated conditions.

The second DB storage 26 stores therein a second database. The second DB storage 26 may be implemented by a server or a cloud external to the information processing device 10.

The second database stores therein a plurality of pieces of reference image-capturing information. Each of the pieces of reference image-capturing information includes reference image data, reference position data, and reference orientation data.

The reference image data represents a two-dimensional image captured with a monocular camera. The reference position data represents the image-capturing position at which the reference image data is captured. The reference orientation data represents the image-capturing orientation of the camera with which the reference image data is captured.

These pieces of reference image-capturing information are information generated by an operator, a robot, or the like by capturing a plurality of objects to be inspected with cameras. The reference position data and the reference orientation data are information input by an operator or the like when the reference image data is captured. The reference image data preferably represents images with high accuracy captured with a high-spec camera, such as a single-lens reflex camera. This allows the second database to store therein a plurality of pieces of reference image-capturing information of high accuracy.

The second management unit 28 manages the second database stored in the second DB storage 26. For example, the second management unit 28 manages access to the second database. The second management 28 may obtain, from the second database, one or more pieces of reference image-capturing information that match the designated conditions.

The obtainment unit 30 obtains target image data via communication means such as the Internet. The target image data is image data obtained by capturing an object to be inspected with a camera. The target image data may be image data captured by an operator or image data captured by a robot. The target image data may be image data captured with a small camera such as a smartphone, or may be image data captured with a high-spec camera such as a single-lens reflex camera.

In addition to the target image data, the obtainment unit 30 also obtains target date and time data representing the image-capturing date and time, and target camera parameters representing at least focal length and image center. The obtainment unit 30 sends the target image data, the target date and time data, and the target camera parameters to the position estimation unit 32, the depth estimation unit 34, and the register 36.

The position estimation unit 32 receives the target image data. Based on the target image data, the position estimation unit 32 estimates target position data representing the image-capturing position at which the target image data is captured, and target orientation data representing the image-capturing orientation of the camera with which the target image data is captured. Then, the position estimation unit 32 sends the estimated target position data and the target orientation data to the register 36.

In the present embodiment, the position estimation unit 32 obtains a plurality of pieces of reference image-capturing information from the second database via the second management unit 28. The position estimation unit 32 estimates target position data and target orientation data by comparing the target image data with each of the obtained pieces of reference image-capturing information. For example, the position estimation unit 32 searches the plurality of reference image data included in the reference image-capturing information pieces for proximity image data captured at an image-capturing position and an image-capturing orientation that are closest to those of the target image data. Then, the position estimation unit 32 calculates target position data and target orientation data based on the position difference and the orientation difference between the target image data and the proximity image data, and the reference position data and the reference orientation data included in the reference image-capturing information that includes the proximity image data.

The position estimation unit 32 may use a deep neural network to calculate the target position data and the target orientation data based on the target image data and the pieces of reference image-capturing information. For example, the position estimation unit 32 may calculate the target position data and the target orientation data using the deep neural network described in Ryo Nakashima and Akihito Seki, "SIR-Net: Scene-Independent End-to-End Trainable Visual Relocalizer", 2019 International Conference on 3D Imaging, Modeling, Processing, Visualization and Transmission (3DIMPVT), IEEE, 16-19 Sep. 2019, pp. 472-481 (hereinafter referred to as "Nakashima and Seki").

The depth estimation unit 34 receives the target image data. Based on the target image data, the depth estimation unit 34 estimates target depth data representing the distance from the image-capturing position represented by the target position data to the object included in the target image data. Then, the depth estimation unit 34 sends the estimated target depth data to the register 36.

In the present embodiment, the depth estimation unit 34 estimates the target depth data representing the distance to each of the objects at respective pixel positions based on the intensity of blurring of the target image data. The depth estimation unit 34 can estimate the target depth data from the target image data using a model that is trained in advance through machine learning and associates the intensity of blurring of an object included in the image data with a distance to the object. For example, the depth estimation unit 34 can calculate the target depth data from the target image data using the deep neural network described in Masako Kashiwagi, Nao Mishima, Tatsuo Kozakaya, Shinsaku Hiura, "Deep Depth from Aberration Map", 2019 IEEE/CVF International Conference on Computer Vision (ICCV), IEEE, 27 Oct.-2 Nov. 2019, pp. 4069-4078 (hereinafter referred to as "Kashiwagi et al."). In the present embodiment, the depth estimation unit 34 estimates the depth data based on the intensity of blurring of the target image. Instead, the depth estimation unit 34 may estimate the depth data from the context of the target image, calculate the depth data from the disparity estimated using a stereo camera, or generate the depth data based on the data measured with a distance measurement device that uses laser irradiation such as light detection and ranging (LiDAR).

The register 36 obtains target image data, target date and time data, target camera parameters, target position data, target orientation data, and target depth data. The register 36 generates new image-capturing information including the target image data, the target date and time data, the target camera parameters, the target position data, the target orientation data, and the target depth data as image data, date and time data, camera parameters, position data, orientation data, and depth data. Then, the register 36 registers the generated new image-capturing information in the first database stored in the first DB storage 22. In this manner, the register 36 can add new image-capturing information to the first database each time the obtainment unit 30 obtains target image data.

The map storage 40 stores therein map data representing a map of the environment in which the pieces of image data stored in the first database are captured. For example, the map data represents an image such as a map of a place where a plurality of objects to be inspected are provided, a layout map of equipment, or a floor map. The pixel positions of the map data may correspond to respective positions of three-dimensional points in real space. For example, when the map data represents a floor map, the pixels correspond to the respective two-dimensional positions on the actual floor.

The display controller 42 obtains map data stored in the map storage 40. Then, the display controller 42 displays the obtained map data on the display device.

The display controller 42 also obtains one or more pieces of image-capturing information from the first database. For each of the obtained one or more pieces of image-capturing information, the display controller 42 displays, on the map data, image-capturing position information indicating that the image data and the depth data are present. At this time, the display controller 42 displays the image-capturing position information at the pixel position in the map data that corresponds to the image-capturing position represented by the position data.

Additionally, for each of the obtained one or more pieces of image-capturing information, the display controller 42 displays, on the map data, image-capturing orientation information representing the image-capturing orientation of the camera with which the image data is captured. At this time, the display controller 42 displays the image-capturing orientation information at the pixel position in the map data that corresponds to the image-capturing position represented by the position data.

The input unit 44 obtains condition information that is used to obtain one or more pieces of image-capturing information from the first database. For example, the input unit 44 obtains condition information based on information input by the user. For example, the input unit 44 obtains a date and time as condition information. When the condition information is obtained, the display controller 42 obtains, from the first database, one or more pieces of image-capturing information matching the condition information. For example, when a date and time are obtained as the condition information, the display controller 42 obtains, from the first database, one or more pieces of image-capturing information including the date and time data that match the condition information, and displays the image-capturing position information and the image-capturing orientation information on the map data for each of the obtained one or more pieces of image-capturing information.

Furthermore, the input unit 44 may receive from a user, for example, designation of one of the pieces of image-capturing information stored in the first database. For example, the input unit 44 receives designation of any of the one or more pieces of image-capturing information obtained by the display controller 42. For example, when an operation such as clicking on image-capturing position information displayed on the map data is performed, the input unit 44 receives the designation of the image-capturing information corresponding to the clicked image-capturing position information. Here, the image-capturing information that is designated is referred to as designated image-capturing information.

Then, the display controller 42 displays, on the display device, at least one of the image data and the depth data included in the designated image-capturing information. At this time, the display controller 42 displays the image data or the depth data in association with the pixel position in the map data that corresponds to the image-capturing position represented by the position data included in the designated image-capturing information.

Additionally, the input unit 44 receives an operation for performing a state comparison process. The state comparison process is a process of automatically detecting whether an object has changed due to deterioration or the like, based on two pieces of image data or two pieces of depth data captured at different dates and times.

When the input unit 44 receives an operation for performing the state comparison process, the comparison unit 46 performs the state comparison process. In the state comparison process, the comparison unit 46 obtains, among the pieces of image-capturing information stored in the first database, first image-capturing information and second image-capturing information including image data of the same object captured at different dates and times.

For example, the input unit 44 may receive designation of the first image-capturing information and the second image-capturing information together with the operation for performing a state comparison process. In this case, the comparison unit 46 obtains the first image-capturing information and the second image-capturing information designated by the user.

Then, the comparison unit 46 generates changed-region information representing a region of the object in which the state has changed, based on the obtained first image-capturing information and the second image-capturing information. For example, the comparison unit 46 compares the image data included in the first image-capturing information with the image data included in the second image-capturing information to generate changed-region information representing a region of the object in which the state has changed.

In this case, the comparison unit 46 performs viewpoint conversion processing on at least one of the image data included in the first image-capturing information and the image data included in the second image-capturing information, so that the image data included in the first image-capturing information and the image data included in the second image-capturing information are converted to correspond to the state where they are captured at the same image-capturing position and the same image-capturing orientation.

Then, the comparison unit 46 generates changed-region information by comparing the image data included in the first image-capturing information with the image data included in the second image-capturing information after converted to correspond to the state where they are captured at the same image-capturing position and the same image-capturing orientation. For example, the comparison unit 46 calculates the difference in color or brightness between the image data included in the first image-capturing information and the image data included in the second image-capturing information after converted to correspond to the state where they are captured at the same image-capturing position and the same image-capturing orientation, and generates changed-region information representing the region in which the difference is greater than or equal to a predetermined threshold value. As a result, the comparison unit 46 can accurately compare the two pieces of image data that are obtained by capturing an object from different viewpoints, and generate changed-region information that accurately represents the region of the object in which the state has changed.

In another example, the comparison unit 46 compares the depth data included in the first image-capturing information with the depth data included in the second image-capturing information to generate changed-region information representing a region of the object in which the state has changed. For example, the comparison unit 46 performs viewpoint conversion processing on at least one of the depth data included in the first image-capturing information and the depth data included in the second image-capturing information, so that the depth data included in the first image-capturing information and the depth data included in the second image-capturing information are converted to correspond to the state where they are captured at the same image-capturing position and the same image-capturing orientation.

Then, the comparison unit 46 generates changed-region information by comparing the depth data included in the first image-capturing information with the depth data included in the second image-capturing information after converted to correspond to the state where they are captured at the same image-capturing position and the same image-capturing orientation. For example, the comparison unit 46 calculates the difference in distance between the depth data included in the first image-capturing information and the depth data included in the second image-capturing information after converted to correspond to the state where they are captured at the same image-capturing position and the same image-capturing orientation, and generates changed-region information representing the region in which the difference is greater than or equal to a predetermined threshold value. As a result, the comparison unit 46 can accurately compare the two pieces of depth data that are obtained by capturing an object from different viewpoints, and generate changed-region information that accurately represents the region of the object in which the state has changed.

The comparison unit 46 sends the generated changed-region information to the display controller 42. When the state comparison process is performed, the display controller 42 displays, on the display device, the image data or depth data included in the first or second image-capturing information, and displays the changed-region information in association with the region in the image data or the depth data in which the state of the object has changed.

When the changed-region information is generated, the comparison unit 46 may further calculate the size of the region of the object in which the state has changed. For example, the comparison unit 46 may calculate the size of the region in which the state has changed in real space, based on the pixel size of the changed-region information on the image data. For example, the comparison unit 46 may also calculate the amount of change in depth in real space of the region in which the state has changed, based on the difference in distance at the same pixel position between the depth data included in the first image-capturing information and the depth data included in the second image-capturing information after converted to correspond to the state where they are captured at the same image-capturing position and the same image-capturing orientation.

Then, in this case, the comparison unit 46 sends the size of the region in which the state has changed to the display controller 42. The display controller 42 displays, on the display device, the image data or depth data included in the first or second image-capturing information, and also displays the size calculated by the comparison unit 46 in association with the region of the object in which the state has changed in the image data or depth data.

Figure 3:
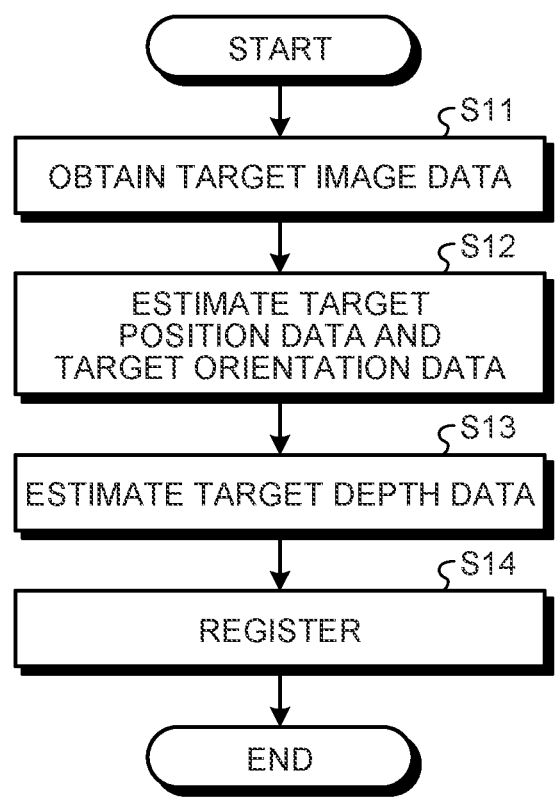
FIG. 3 is a flowchart illustrating the flow of a registration process of the information processing device.

FIG. 3 is a flowchart illustrating the flow of a registration process of the information processing device 10. Upon obtaining target image data via communication means such as the Internet, the information processing device 10 performs a process according to the flow illustrated in FIG. 3.

First, at S11, the information processing device 10 obtains target image data. The information processing device 10 also obtains target date and time data representing the date and time at which the target image data is captured, and target camera parameters representing the camera parameters used to capture the target image data.

At S12, based on the target image data, the information processing device 10 estimates target position data representing the image-capturing position at which the target image data is captured, and target orientation data representing the image-capturing orientation of the camera with which the target image data is captured. For example, the information processing device 10 inputs the target image data and a plurality of pieces of reference image-capturing information stored in the second database into the deep neural network described in Nakashima and Seki to estimate target position data and target orientation data.

At S13, based on the target image data, the information processing device 10 then estimates target depth data representing the distance from the image-capturing position represented by the target position data to the object included in the target image data. For example, the information processing device 10 inputs the target image data into the deep neural network described in Kashiwagi et al. to calculate the depth data.

At S14, the information processing device 10 generates new image-capturing information including the target image data, target date and time data, target camera parameters, target position data, target orientation data, and target depth data. The information processing device 10 then registers the generated new image-capturing information in the first database. Upon completing S14, the information processing device 10 ends the process of this flow.

Each time target image data is obtained, the information processing device 10 performs a process according to the flow from S11 to S14. In this manner, each time images of interior parts of a building, such as a social infrastructure, a plant, or a factory, and equipment or the like provided therein are captured from various positions, the information processing device 10 generates image-capturing information including image data, date and time data, position data, orientation data, and camera parameters, and registers the generated information in the first database.

Figure 4:
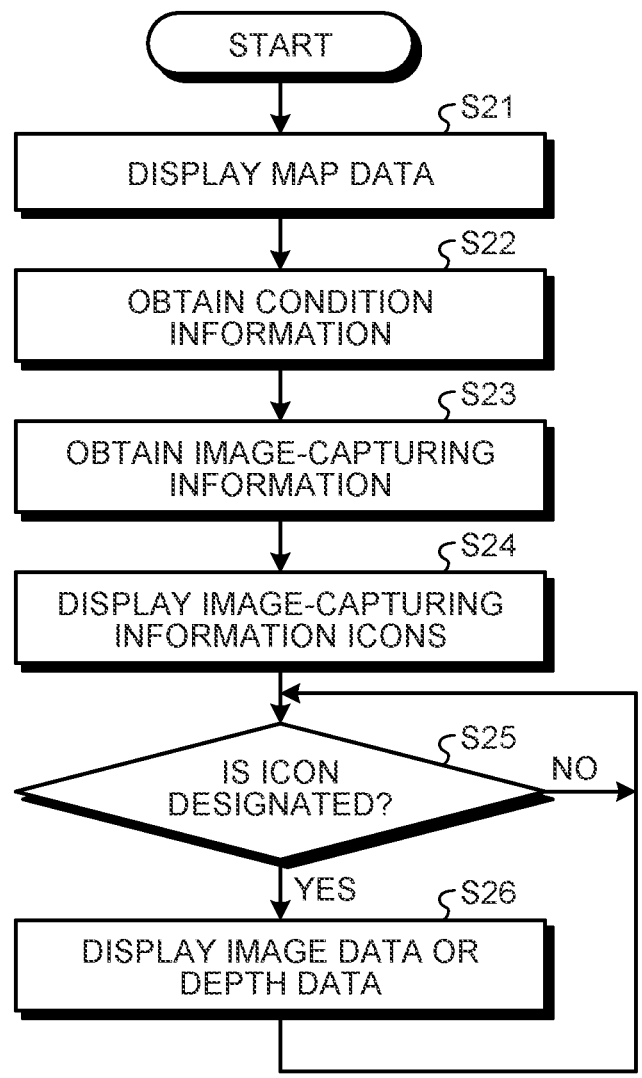
FIG. 4 is a flowchart illustrating the flow of a display process of the information processing device.
Figure 5:
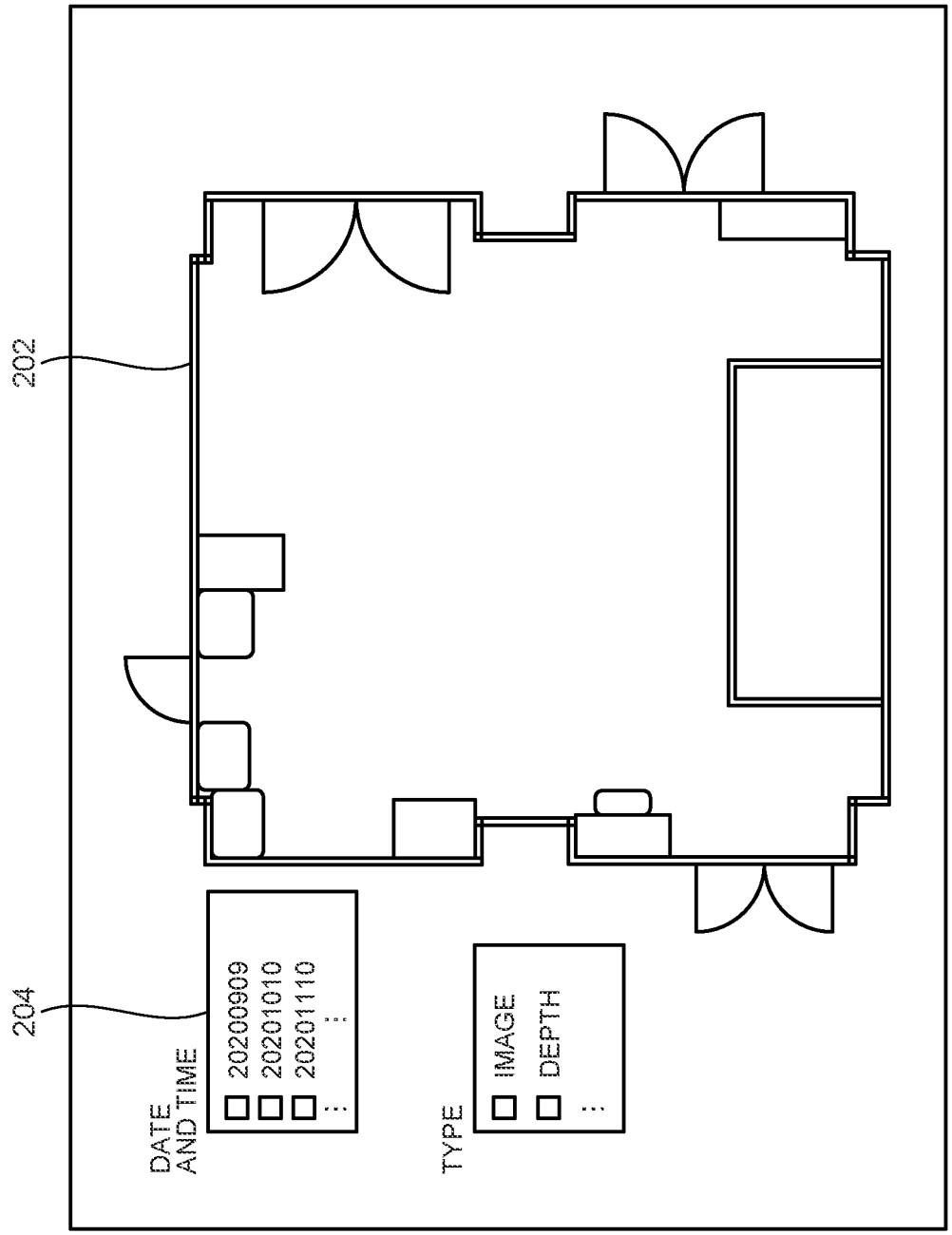
FIG. 5 is a diagram illustrating an example of a display device displaying map data.
Figure 6:
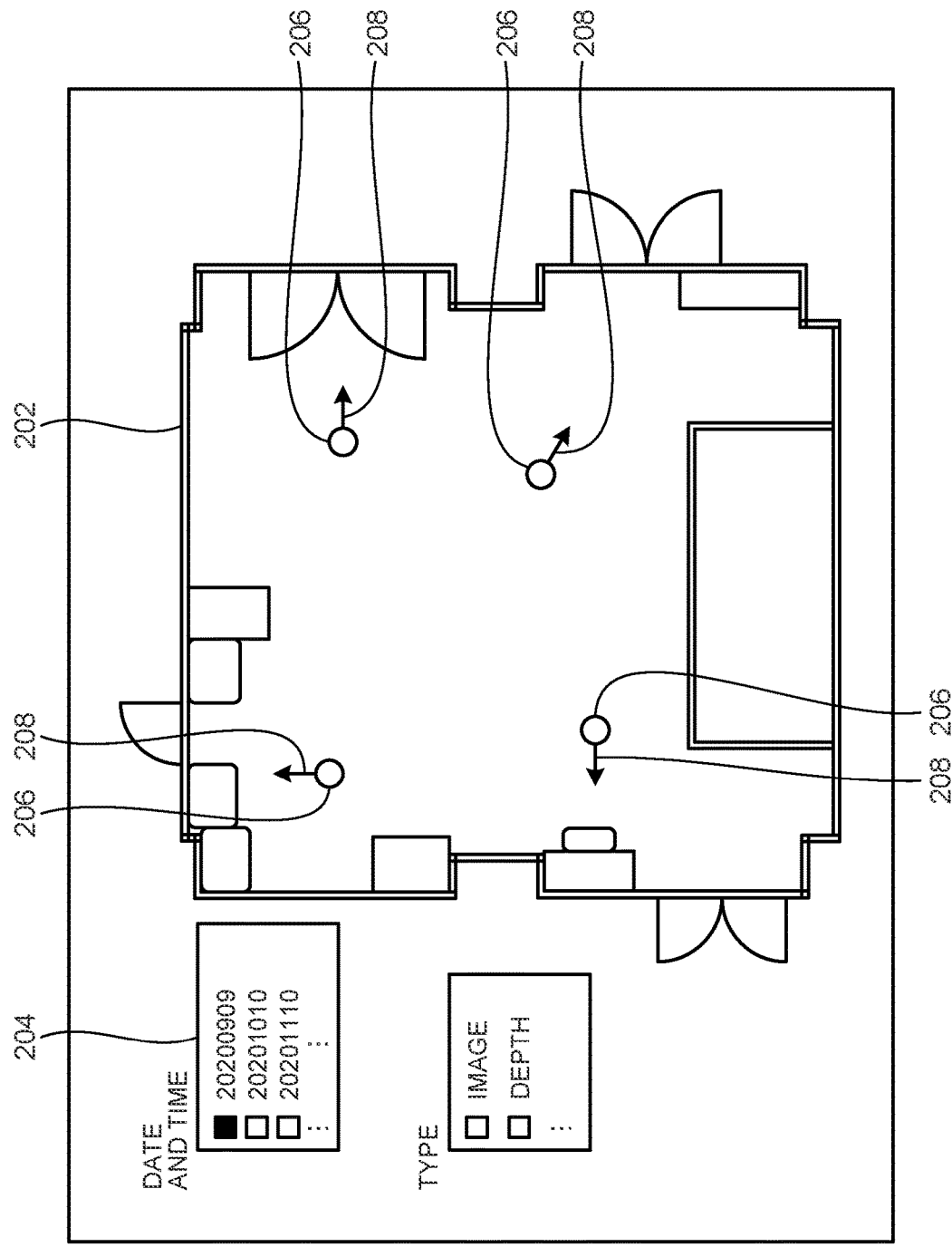
FIG. 6 is a diagram of an example of the display device displaying position icons and direction icons.
Figure 7:
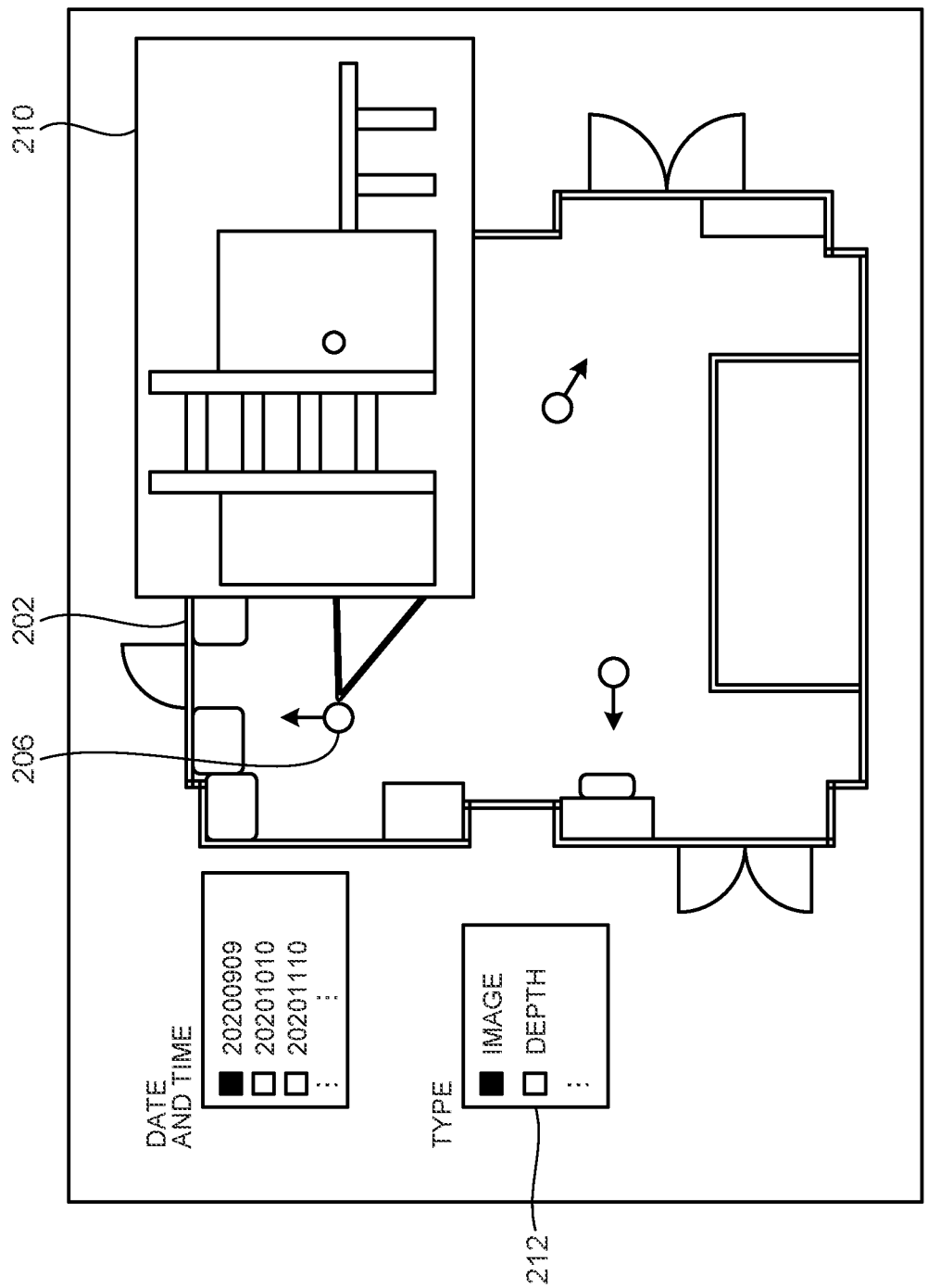
FIG. 7 is a diagram of an example of a display device displaying the map data and image data.

FIG. 4 is a flowchart illustrating the flow of a display process of the information processing device 10. FIG. 5 is a diagram illustrating an example of a screen of a display device displaying map data. FIG. 6 is a diagram illustrating an example of a screen of the display device displaying map data, position icons 206, and direction icons 208. FIG. 7 is a diagram illustrating an example of a screen of the display device displaying map data and image data.

When an operation for information display is performed through a user operation, for example, the information processing device 10 performs a process according to the flow illustrated in FIG. 4.

First, at S21, the information processing device 10 obtains map data stored in the map storage 40, and displays the obtained map data on the display device. For example, as illustrated in FIG. 5, the information processing device 10 displays, on the display device, a floor map image 202, as map data, representing a floor map of an indoor area in which a plurality of objects to be inspected are installed.

At S22, the information processing device 10 obtains condition information. For example, as illustrated in FIG. 5, the information processing device 10 displays, on the display device, a date input box 204 for receiving designation of a date, which is an example of the condition information. Then, the information processing device 10 allows the user to input a date in the date input box 204. The information processing device 10 may obtain not only the date but also the month, the year, or an any period as the condition information.

At S23, the information processing device 10 then obtains one or more pieces of image-capturing information matching the obtained condition information from the first database. For example, the information processing device 10 obtains from the first database one or more pieces of image-capturing information including date and time data that match the date entered in the date input box 204.

Then, at S24, for each of the obtained one or more pieces of image-capturing information, image-capturing position information, which represents the presence of image data and depth data, and image-capturing orientation information, which represents the image-capturing orientation of the camera with which the image data is captured, are displayed on the map data. For example, as illustrated in FIG. 6, for each of the obtained one or more pieces of image-capturing information, the information processing device 10 displays, on the display device, a position icon 206 as image-capturing position information and a direction icon 208 as image-capturing orientation information. At this time, the information processing device 10 displays the position icon 206 at the pixel position in the floor map image 202 that corresponds to the image-capturing position indicated by the corresponding position data. The information processing device also 10 displays the direction icon 208 at the pixel position in the floor map image 202 that corresponds to the image-capturing position indicated by the corresponding position data such that the direction icon 208 indicates the direction represented by the corresponding orientation data.

Then, at S25, the information processing device 10 determines whether any of the obtained one or more pieces of image-capturing information is designated as the designated image-capturing information. For example, when any of the one or more position icons 206 displayed on the display device as illustrated in FIG. 6 is clicked with a mouse or the like, the information processing device 10 determines that the image-capturing information corresponding to the clicked position icon 206 is designated as designated image-capturing information.

When none of the pieces of image-capturing information is designated (No at S25), the information processing device 10 halts the process at S25. When one of the pieces of image-capturing information is designated (Yes at S25), the information processing device 10 proceeds to S26.

At S26, the information processing device 10 displays at least one of the image data and the depth data included in the designated image-capturing information, in association with the pixel position in the map data that corresponds to the image-capturing position represented by the position data included in the designated image-capturing information. For example, as illustrated in FIG. 7, the display controller 42 displays the image data or the depth data included in the designated image-capturing information in an inset 210 extending from the corresponding position icon 206 in the floor map image 202. The display controller 42 may also display a window different from the floor map image 202 and display the image data or depth data in this window.

Furthermore, the information processing device 10 may display a type designation box 212 on the display device to allow the user to designate either the image data or the depth data. The information processing device 10 allows the user to select, with the type designation box 212, which of the image data or the depth data is to be displayed. Then, the information processing device 10 may display, in the inset 210, one of the image data and the depth data included in the designated image-capturing information that is selected with the type designation box 212.

Upon completing the process of S26, the information processing device 10 returns the process to S25. Then, when different image-capturing information is newly designated, the information processing device 10 performs the process of step S26 for the new designated image-capturing information.

When the user performs an operation for information display, the information processing device 10 performs the process from S21 to S26. Thus, the information processing device 10 can display, to the user, image data and corresponding depth data that are obtained by capturing images of interior parts of a building, such as a social infrastructure, a plant, or a factory, and equipment or the like provided therein at various positions, in association with the map data. As a result, with the information processing device 10, it is easy to recognize which object the image data or the depth data is concerned with. Accordingly, the information processing device 10 can display the image data or depth data in a manner that facilitates the comparison with other image data or other depth data.

Furthermore, with the information processing device 10, the image data and depth data to be displayed can be easily narrowed down with the condition information, such as date and time. The information processing device 10 thus enables the user to easily recognize how the object has changed over time.

Figure 8:
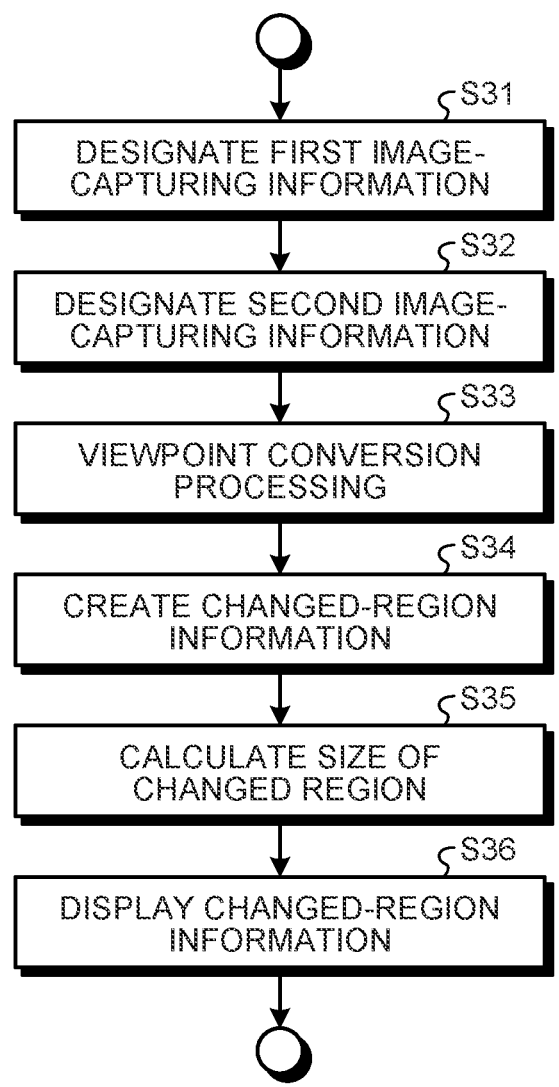
FIG. 8 is a flowchart illustrating the flow of a process of creating changed-region information of the information processing device.
Figure 9:
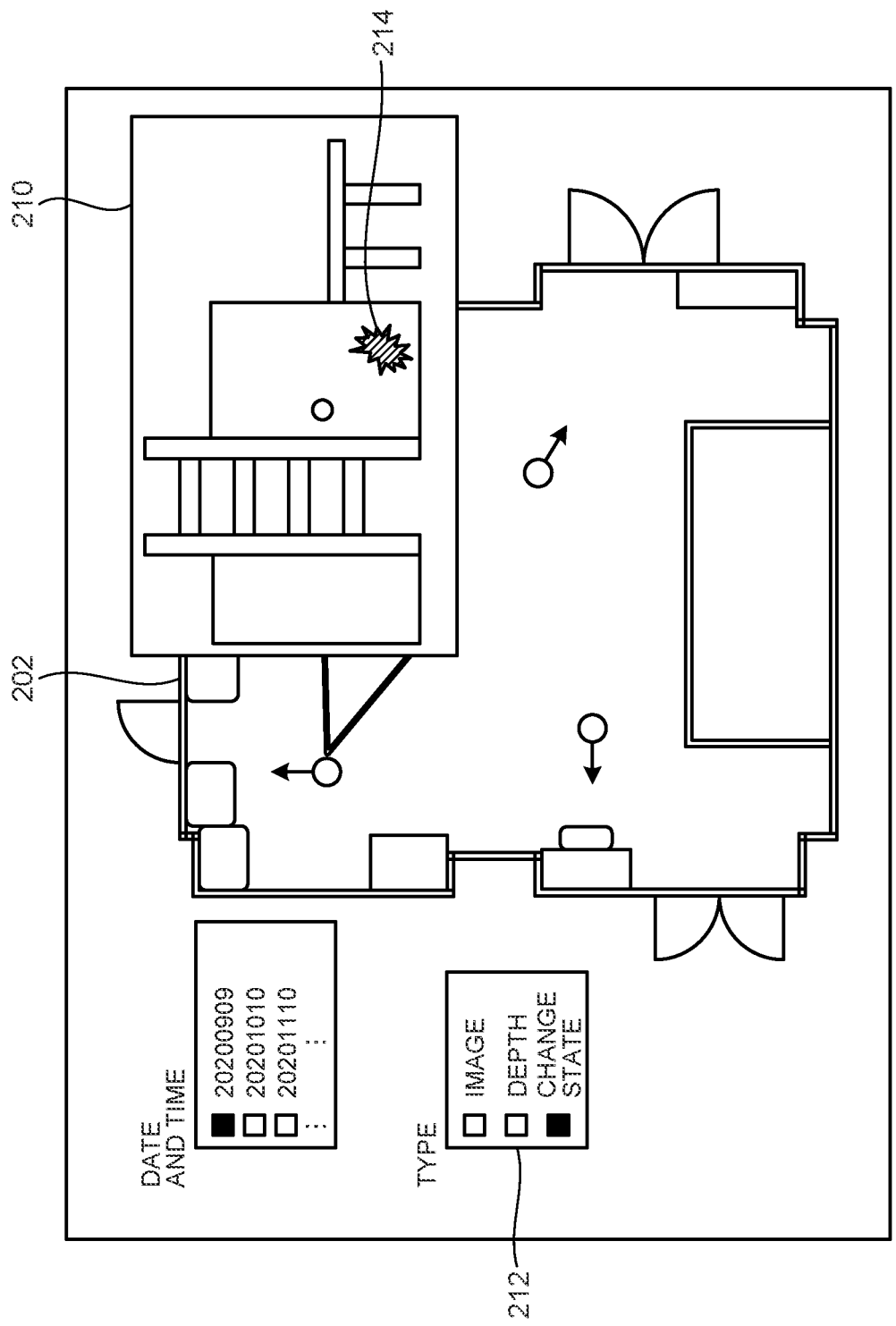
FIG. 9 is a diagram of an example of a screen of the display device displaying a changed-region image.

FIG. 8 is a flowchart illustrating the flow of a process of creating changed-region information of the information processing device 10. FIG. 9 is a diagram illustrating an example of a screen of the display device displaying changed-region information.

The information processing device 10 performs a state comparison process for detecting whether an object has changed. For example, as illustrated in FIG. 9, the information processing device 10 may display on the display device a type designation box 212 including a changed-state button to allow the user to detect a changed state. Then, when the changed-state button is selected by the user, the information processing device 10 performs a state comparison process in the flow illustrated in FIG. 8.

First, at S31, the information processing device 10 receives designation of first image-capturing information. For example, when any of the position icons 206 displayed on the floor map image 202 is clicked after an operation for performing the state comparison process is received, the information processing device 10 receives the image-capturing information corresponding to the clicked position icon 206 as first image-capturing information.

Then, at S32, the information processing device 10 receives designation of second image-capturing information. For example, the information processing device 10 selects one or more pieces of image-capturing information that include position data and orientation data within a predetermined distance and angle from the position data and orientation data included in the first image-capturing information, and also include date and time data different from the date and time data included in the first image-capturing information. Then, the information processing device 10 displays, on the floor map image 202, the position icons 206 and the direction icons 208 for the selected one or more pieces of image-capturing information. Then, when any of the position icons 206 displayed on the floor map image 202 is clicked, the information processing device 10 receives the image-capturing information corresponding to the clicked position icon 206 as the second image-capturing information. As a result, the information processing device 10 can obtain the first and second image-capturing information including image data of the same object captured at different dates and times from viewpoints in the vicinity.

Then, at S33, the information processing device 10 performs viewpoint conversion processing on at least one of the image data included in the first image-capturing information and the image data included in the second image-capturing information, so that the image data included in the first image-capturing information and the image data included in the second image-capturing information are converted to correspond to the state where they are captured at the same image-capturing position and the same image-capturing orientation. Furthermore, the information processing device 10 performs viewpoint conversion processing on the depth data included in the first image-capturing information and the depth data included in the second image-capturing information in a similar manner, so that the depth data included in the first image-capturing information and the depth data included in the second image-capturing information are converted to correspond to the state where they are captured at the same image-capturing position and the same image-capturing orientation. The further details of the line-of-sight conversion processing will be described later with reference to FIG. 10.

Then, at S34, the information processing device 10 generates changed-region information representing the region of the object in which the state has changed, by comparing the image data included in the first image-capturing information and the image data included in the second image-capturing information after converted to correspond to the state where they are captured at the same image-capturing position and the same image-capturing orientation. For example, the information processing device 10 generates changed-region information representing the region in which the difference in color or brightness is greater than or equal to a predetermined threshold value, by comparing corresponding pixels of the image data included in the first image-capturing information and the image data included in the second image-capturing information after converted to correspond to the state where they are captured at the same image-capturing position and the same image-capturing orientation. Instead of or in addition to this, the information processing device 10 may generate changed-region information by comparing the depth data included in the first image-capturing information and the depth data included in the second image-capturing information after converted to the state where they are captured at the same image-capturing position and the same image-capturing orientation. For example, the information processing device 10 generates changed-region information representing the region in which the difference in distance is greater than or equal to a predetermined threshold value by comparing corresponding pixels of the depth data included in the first image-capturing information with the depth data included in the second image-capturing information after converted to correspond to the state where they are captured at the same image-capturing position and the same image-capturing orientation.

Then, at S35, the information processing device 10 calculates the size of the region of the object in which the state has changed. For example, the information processing device 10 calculates the size of the region in which the state has changed in real space based on the pixel size of the changed-region information on the image data. For example, the information processing device 10 may also calculate the amount of change in depth in real space in the region in which the state has changed based on the difference in distance at the same pixel position between the depth data included in the first image-capturing information and the depth data included in the second image-capturing information after converted to correspond to the state where they are captured at the same image-capturing position and the same image-capturing orientation.

Then, at S36, the information processing device 10 displays, on the display device, the image data or depth data included in the first or second image-capturing information, and also displays the changed-region information in association with the region of the image data or the depth data in which the state of the object has changed. For example, as illustrated in FIG. 9, the information processing device 10 displays a changed-region image 214 representing the position of the changed region in the region of the image data in which the state of the object has changed. Furthermore, the information processing device 10 may also display the size calculated at S35, in association with the region of the image data in which the state of the object has changed.

Thus, when an interior part of a building, such as a social infrastructure, a plant, or a factory, and equipment or the like provided therein have deteriorated over time, for example, the information processing device 10 allows users to easily recognize the deteriorated part.

FIG. 10 is a diagram for explaining the viewpoint conversion processing. For example, the information processing device 10 uses the following method to perform the viewpoint conversion processing.

First image data $I_i$ illustrated in FIG. 10 is image data obtained by capturing a first object 230 from a first image-capturing position i. First depth data $D_i$ has the same angle of view as that of the first image data $I_i$ and represents the distances from the first image-capturing position i to the first object 230 and objects around the first object 230.

Second image data $I_j$ illustrated in FIG. 10 is image data obtained by capturing the first object 230 from a second image-capturing position j. The second image-capturing position j differs from the first image-capturing position i. Second depth data $D_j$ has the same angle of view as that of the second image data $I_j$ and represents the distances from the second image-capturing position j to the first object 230 and the objects around the first object 230.

$T_{ji}$ represents a translation vector that translates the camera from the first image-capturing position i to the second image-capturing position j. $R_{ji}$ represents a rotation vector that rotates and moves the camera from the image-capturing orientation of the camera at the first image-capturing position i to the image-capturing orientation of the camera at the second image-capturing position j.

When the position of pixel p in the first image data $I_i$ and the first depth data $D_i$ is represented as (x,y) and the depth is represented as $D_i(p)$, the three-dimensional coordinates of the pixel p $\{X_i(p),Y_i(p),Z_i(p)\}$ is expressed as Expression (1).

$$\begin{pmatrix} X_i(p) \\ Y_i(p) \\ Z_i(p) \end{pmatrix} = \begin{pmatrix} Z_i(p) \cdot \dfrac{(x-c_x)}{f_x} \\ Z_i(p) \cdot \dfrac{(y-c_y)}{f_y} \\ D_i(p) \end{pmatrix} \quad (1)$$

$f_x$ represents the horizontal component of the focal length of the first image data $I_i$. $f_y$ represents the vertical component of the focal length of the first image data $I_i$. $c_x$ represents the horizontal component of the image center of the first image data $I_i$. cy represents the vertical component of the image center of the first image data $I_i$.

Here, p is the pixel position in the first image data $I_i$ and the first depth data $D_i$ at which point P of the first object 230 is displayed. The three-dimensional coordinates of p $\{X_i(p), Y_i(p),Z_i(p)\}$ are the three-dimensional coordinates of point P as viewed from the first image-capturing position i. As such, the three-dimensional coordinates $\{X',Y',Z'\}$ of point P as viewed from the second image-capturing position j are expressed as in Expression (2), based on $T_{ji}$ and $R_{ji}$ and the three-dimensional coordinates $\{X_i(p),Y_i(p),Z_i(p)\}$ of pixel p.

$$\begin{pmatrix} X' \\ Y' \\ Z' \end{pmatrix} = R_{ji} \cdot \begin{pmatrix} X_i(p) \\ Y_i(p) \\ Z_i(p) \end{pmatrix} + T_{ji} \quad (2)$$

p' is the pixel position in the second image data $I_j$ and the second depth data $D_j$ at which point P of the first object 230 is displayed. p' is calculated by projecting the three-dimensional coordinates $\{X',Y',Z'\}$ onto the second image data $I_j$. As such, pixel p'=(x',y') at which point P of the first object 230 is displayed in the second image data $I_j$ is expressed by Expression (3).

$$p' = \begin{pmatrix} x' \\ y' \end{pmatrix} = \begin{pmatrix} f'_x \cdot \dfrac{X'}{Z'} + c'_x \\ f'_y \cdot \dfrac{Y'}{Z'} + c'_y \end{pmatrix} \quad (3)$$

$f'_x$ represents the horizontal component of the focal length of the second image data $I_j$. $f'_y$ represents the vertical component of the focal length of the second image data $I_j$. $c'_x$ represents the horizontal component of the image center of the second image data $I_j$. $c'_y$ represents the vertical component of the image center of the second image data $I_j$.

Z' represents the depth ($D_j(p')$) of pixel p' at which point P of the first object 230 is displayed in the second depth data $D_j$.

Thus, through the calculation using Expressions (1), (2), and (3), the information processing device 10 can perform the viewpoint conversion processing such that the image data and the depth data included in the first image-capturing information are converted into corrected image data and corrected depth data captured from the image-capturing position and the image-capturing orientation of the image data included in the second image-capturing information.

There may be cases where p'(=(x',y')) is not an integer. In this case, the information processing device 10 performs bilinear interpolation processing or the like on the corrected image data and the corrected depth data after the viewpoint conversion processing, and converts them into corrected image data and corrected depth data including pixels of integer positions. As a result, the information processing device 10 can generate changed-region information by comparing image data and depth data including a plurality of pixels of the same positions.

The information processing device 10 may also perform viewpoint conversion processing other than the above method. For example, the information processing device 10 may convert each of the image data and depth data included in the first image-capturing information and the image data and depth data included in the second image-capturing information into three-dimensional point cloud information expressed by three-dimensional coordinates using Expression (1), and match the viewpoints in the state of the three-dimensional point cloud information. In this case, the information processing device 10 may use a technique such as Iterative Closest Point (ICP) or Normal Distribution Transform (NDT) to match the viewpoints in the state of the three-dimensional point cloud information.

Figure 11:
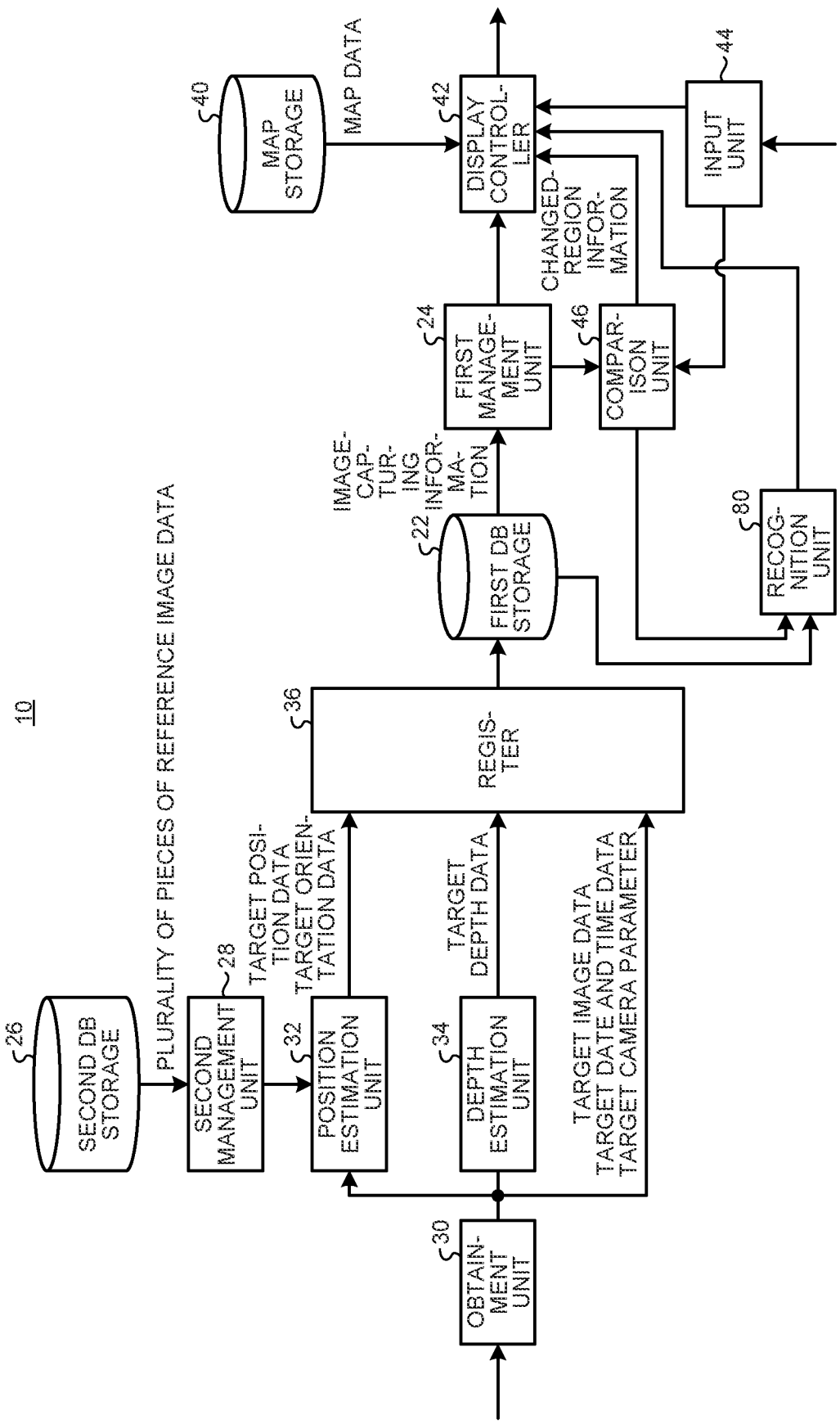
FIG. 11 is a diagram of the functional configuration of an information processing device according to a first modification.

FIG. 11 illustrates the functional configuration of an information processing device 10 according to a first modification. Instead of the configuration illustrated in FIG. 1, the information processing device 10 may have a configuration according to the first modification as illustrated in FIG. 11.

Since the information processing device 10 according to the first modification is substantially the same as the configuration in FIG. 1, the same reference numerals are given to those components that are the same or have the same function. Such components will not be described in detail other than the differences. The same applies to second and subsequent modifications.

The information processing device 10 according to a third modification further includes a recognition unit 80. When any of the one or more pieces of image-capturing information obtained by the display controller 42 is designated as designated image-capturing information, the recognition unit 80 obtains the image data included in the designated image-capturing information. For example, when any of the one or more position icons 206 displayed on the display device is clicked with a mouse or the like, the recognition unit 80 obtains the image data included in the designated image-capturing information corresponding to the clicked position icon 206.

The recognition unit 80 performs image recognition processing on the obtained image data, and recognizes the nature of deterioration such as cracks or rust on the object. The recognition unit 80 sends the recognition result to the display controller 42. The display controller 42 displays, on the display device, the recognition result received from the recognition unit 80 together with the image data or the depth data included in the designated image-capturing information. Thus, the information processing device 10 according to the first modification can notify the user of the nature of deterioration when the object is deteriorated.

When the comparison unit 46 executes the state comparison process, the recognition unit 80 may perform image recognition processing on the region of the image data indicated by the changed-region information. The information processing device 10 according to the first modification thus enables the user to recognize the nature of the change that has occurred in the changed region.

Figure 12:
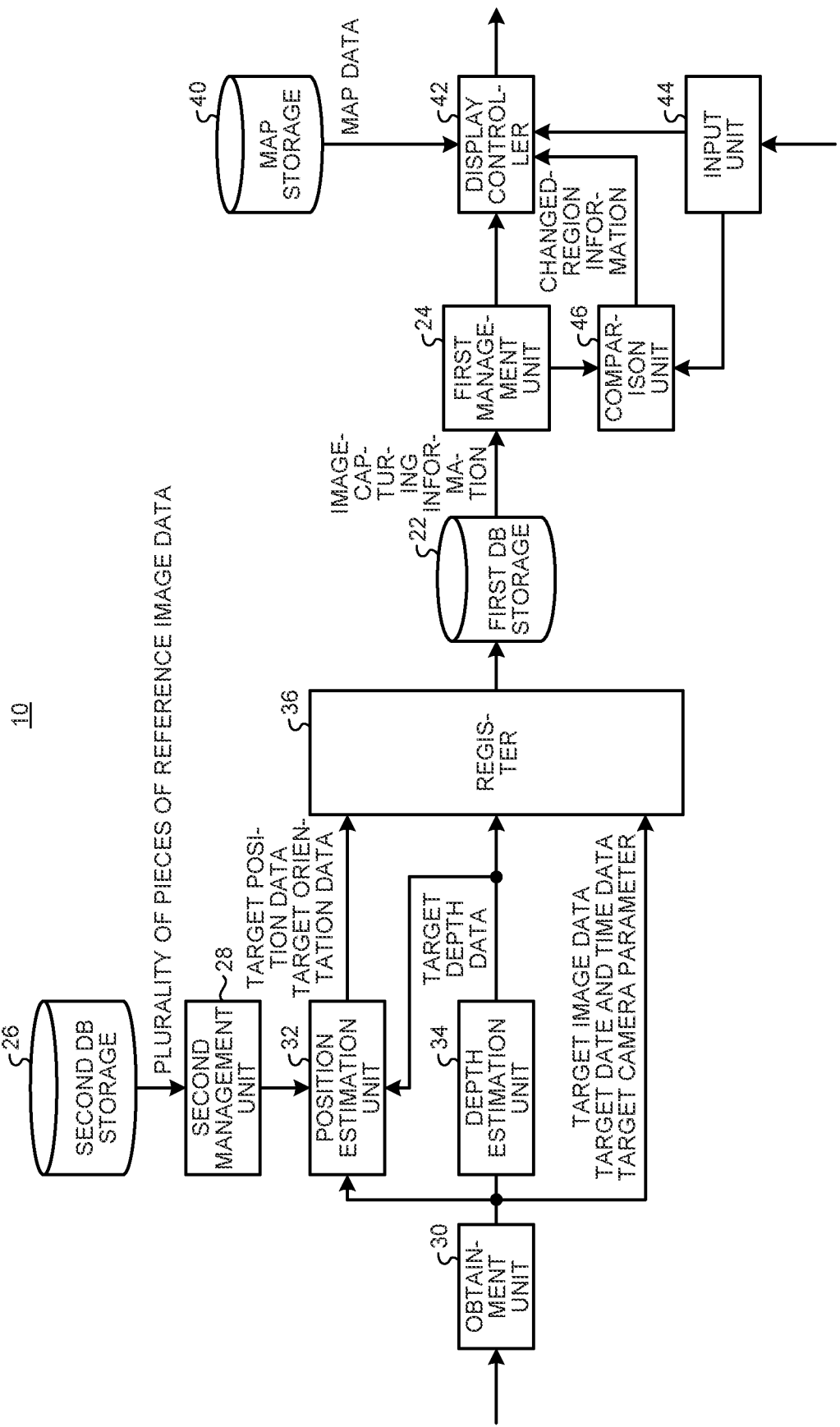
FIG. 12 is a diagram of the functional configuration of an information processing device according to a second modification.

FIG. 12 is a diagram illustrating the functional configuration of an information processing device 10 according to a second modification.

In the second modification, each of the pieces of reference image-capturing information stored in the second database further includes reference depth data. The reference depth data represents the distance from the position at which the reference image data is captured to the object included in the reference image data. The reference depth data has the same angle of view as that of the reference image data. For example, the reference depth data may be depth data generated with a high-spec camera such as a stereo camera. This allows the second database to store therein reference image-capturing information including accurate depth data.

As illustrated in FIG. 12, the depth estimation unit 34 according to the second modification sends the estimated target depth data to the position estimation unit 32.

The position estimation unit 32 according to the second modification receives target image data and target depth data. Based on the target image data and target depth data, the position estimation unit 32 estimates target position data representing the image-capturing position at which the target image data is captured and the target orientation data representing the image-capturing orientation of the camera with which the target image data is captured. Then, the position estimation unit 32 sends the estimated target position data and the target orientation data to the register 36.

In this modification, the position estimation unit 32 obtains a plurality of pieces of reference image-capturing information from the second database via the second management unit 28. Then, the position estimation unit 32 estimates the target position data and the target orientation data by comparing the set of the target image data and the target depth data with each of the obtained pieces of reference image-capturing information. For example, the position estimation unit 32 searches a plurality of sets of reference image data and reference depth data included in a plurality of pieces of reference image-capturing information for a set of proximity image data and proximity depth data that are captured at the image-capturing position and the image-capturing orientation that are the closest to those of the set of the target image data and the target depth data. Then, the position estimation unit 32 calculates target position data and target orientation data based on the position difference and the orientation difference between the set of the target image and the target depth data and the set of the proximity image data and the proximity depth data, and the reference position data and the reference orientation data included in the reference image-capturing information that includes the set of the proximity image data and the proximity depth data. The position estimation unit 32 may use a deep neural network to calculate the target position data and the target orientation data based on the target image data, target depth data, and a plurality of pieces of reference image-capturing information.

The position estimation unit 32 according to the second modification further uses the depth data and can therefore estimate the target position data and the target orientation data with higher accuracy. For example, even when the second database includes a plurality of pieces of reference image data that are similar in appearance to the target image data, the position estimation unit 32 can find the set of proximity image data and proximity depth data with higher accuracy by comparing the target depth data with the reference depth data. This allows the position estimation unit 32 to calculate the target position data and the target orientation data with higher accuracy.

Figure 13:
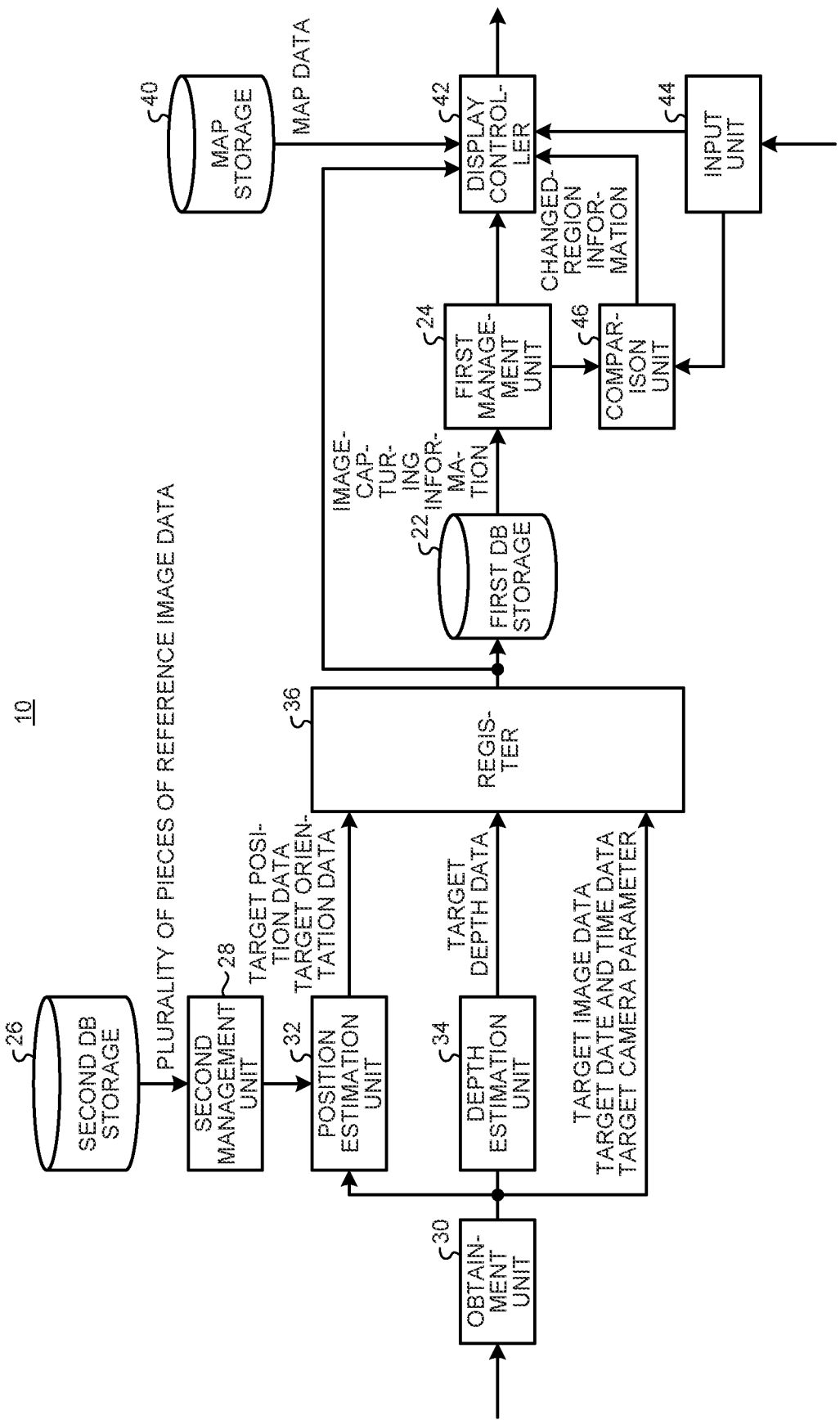
FIG. 13 is a diagram of the functional configuration of an information processing device according to a third modification.

FIG. 13 is a diagram illustrating the functional configuration of an information processing device 10 according to a third modification.

In the third modification, the register 36 registers new image-capturing information including target image data, target date and time data, target camera parameters, target position data, target orientation data, and target depth data in the first database, and also sends the new image-capturing information to the display controller 42 as obtained information. Alternatively, the register 36 according to the third modification may send the new image-capturing information to the display controller 42 as the obtained information without registering the new image-capturing information in the first database.

In the third modification, the display controller 42 obtains one or more pieces of image-capturing information from the first database, and also obtains the obtained information from the register 36. The display controller 42 displays, for each of the obtained one or more pieces of image-capturing information and the registration information, image-capturing position information indicating that image data and depth data are present on the map data.

Then, the display controller 42 receives designation of any of the obtained information and the pieces of image-capturing information. When the obtained information is designated, the display controller 42 displays at least one of the target image data and the target depth data in association with the pixel position in the map data that corresponds to the position data. When any of the pieces of image-capturing information is designated, the display controller 42 displays at least one of the image data and the depth data in association with the pixel position in the map data that corresponds to the position data.

When obtaining target image data via communication means such as the Internet, the information processing device 10 according to the third modification can display, on the display device, obtained information that is generated based on the obtained target image data, together with a plurality of pieces of image-capturing information that are registered in the first database in advance. This enables the determination of the state of deterioration or the like.

Figure 14:
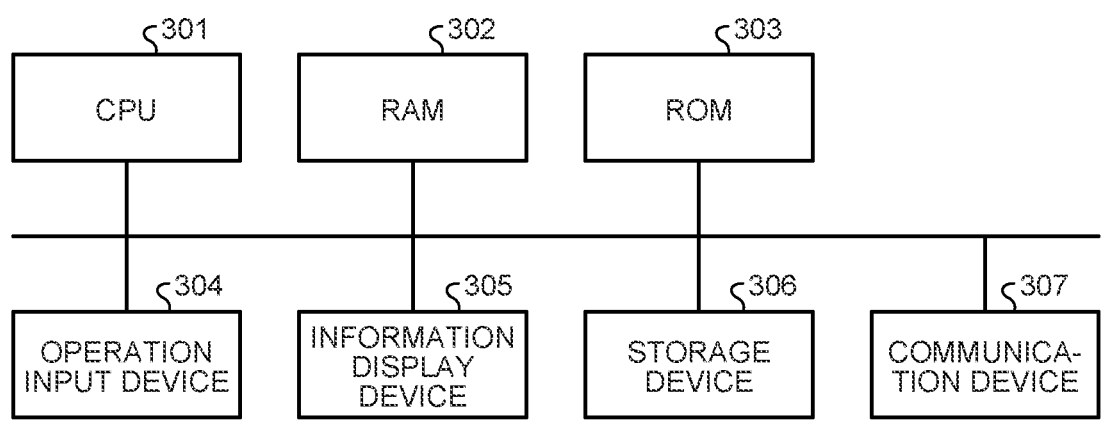
FIG. 14 is a diagram illustrating the hardware configuration of an information processing device.

FIG. 14 is a diagram illustrating an example of the hardware configuration of an information processing device 10 according to an embodiment. The information processing device 10 may be implemented by a computer with a hardware configuration such as that illustrated in FIG. 14. The information processing device 10 includes a central processing unit (CPU) 301, a random-access memory (RAM) 302, a read-only memory (ROM) 303, an operation input device 304, an information display device 305, a storage device 306, and a communication device 307. A bus connects these devices.

The CPU 301 is a processor that executes calculation processing, control processing, and the like according to a computer program. The CPU 301 uses a predetermined area of the RAM 302 as a work area and performs various processes in cooperation with a computer program stored in the ROM 303, the storage device 306, or the like.

The RAM 302 is a memory such as a synchronous dynamic random-access memory (SDRAM). The RAM 302 functions as a work area of the CPU 301. The ROM 303 is a memory that stores therein computer programs and various types of information in a non-rewritable manner.

The operation input device 304 is an input device such as a mouse and a keyboard. The operation input device 304 receives information input from the user as an instruction signal and outputs the instruction signal to the CPU 301.

The information display device 305 is a display device such as a liquid crystal display (LCD), and is an example of a display device. The information display device 305 displays various types of information based on the display signal from the CPU 301.

The storage device 306 is a device that writes and reads data to and from a storage medium made of a semiconductor such as a flash memory, or a storage medium that can record magnetically or optically. The storage device 306 writes and reads data to and from the storage medium in response to control from the CPU 301. The communication device 307 communicates with an external device via a network in response to control from the CPU 301.

The computer program executed by a computer has a modular structure including a first management module, a second management module, an obtainment module, a position estimation module, a depth estimation module, a registration module, a display control module, an input module, and a comparison module. This computer program is loaded into the RAM 302 and executed by the CPU 301 (processor) to cause the processor to function as the first management unit 24, the second management unit 28, the obtainment unit 30, the position estimation unit 32, the depth estimation unit 34, the register 36, the display controller 42, the input unit 44, and the comparison unit 46. This computer program is loaded into and executed on the RAM 302 by the CPU 301 (processor) to cause the storage device 306 to function as the first DB storage 22 and the second DB storage 26. A hardware circuit may implement some or all of the first management unit 24, the second management unit 28, the obtainment unit 30, the position estimation unit 32, the depth estimation unit 34, the register 36, the display controller 42, the input unit 44, and the comparison unit 46.

The computer program to be executed on a computer may be recorded and supplied in a computer-readable recording medium, such as a CD-ROM, a flexible disk, a CD-R, or a digital versatile disc (DVD) in a file of a format that is installable or executable on a computer.

Furthermore, the computer program may be configured to be stored in a computer connected to a network such as the Internet and provided through downloading via the network. Furthermore, the computer program may be configured to be provided or distributed via a network such as the Internet. The computer program to be executed by the information processing device 10 may be configured by being integrated in the ROM 303 or the like in advance to be provided.

While a certain embodiment has been described, these embodiments have been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. An information processing device comprising:
 a hardware processor configured to:
  manage a first database that stores therein a plurality of pieces of image-capturing information, each of the plurality of pieces of image-capturing information including image data, position data, and depth data, the position data representing an image-capturing position at which the image data is captured, and the depth data representing a distance to an object from the image-capturing position represented by the position data;
  obtain target image data;
  estimate, based on the target image data, target position data, the target position data representing an image-capturing position at which the target image data is captured;
  estimate, based on the target image data, target depth data, the target depth data representing a distance to an object from the image-capturing position represented by the target position data, and the target depth data being estimated based on at least one of an intensity of blurring of the target image data, a context of the target image data, a disparity estimated using a stereo camera, and data measured using laser irradiation, wherein the target depth data is estimated from the target image data using a model that is trained through machine learning, and wherein the intensity of blurring is associated with the distance to the object;
  register new image-capturing information including the target image data, the target position data, and the target depth data, in the first database; and
  display, on a display device, map data representing a map of an environment in which the image data is captured,
 wherein the hardware processor is configured to display at least one of the image data and the depth data in association with a pixel position in the map data, the image data and the depth data being included in designated image-capturing information, the designated image-capturing information being designated from among the plurality of pieces of image-capturing information stored in the first database, and the pixel position corresponding to the position data included in the designated image-capturing information.

2. The device according to claim 1, wherein:
each of the plurality of pieces of image-capturing information further includes orientation data, the orientation data representing an image-capturing orientation of a camera with which the image data is captured, and
the hardware processor is configured to:
  further estimate, based on the target image data, target orientation data, the target orientation data representing an image-capturing orientation of a camera with which the target image data is captured; and
  register the new image-capturing information further including the target orientation data in the first database.

3. The device according to claim 2, wherein:
the hardware processor is further configured to manage a second database that stores therein a plurality of pieces of reference image-capturing information,
each of the plurality of pieces of reference image-capturing information includes reference image data, reference position data, and reference orientation data, the reference position data representing an image-capturing position at which the reference image data is captured, and the reference orientation data representing an image-capturing orientation of a camera with which the reference image data is captured, and
the hardware processor is configured to estimate the target position data and the target orientation data by comparing the target image data with each of the plurality of pieces of reference image-capturing information.

4. The device according to claim 2, wherein:
the hardware processor is further configured to manage a second database that stores therein a plurality of pieces of reference image-capturing information,
each of the plurality of pieces of reference image-capturing information includes reference image data, reference position data, reference orientation data, and reference depth data, the reference position data representing an image-capturing position at which the reference image data is captured, the reference orientation data representing an image-capturing orientation of a camera with which the reference image data is captured, and the reference depth data representing a distance to an object from the image-capturing position represented by the reference position data, and
the hardware processor is configured to estimate the target position data and the target orientation data by comparing the target image data and the target depth data with each of the plurality of pieces of reference image-capturing information.

5. The device according to claim 1, wherein the hardware processor is further configured to receive designation of one of the plurality of pieces of image-capturing information as the designated image-capturing information.

6. The device according to claim 1, wherein each of the plurality of pieces of image-capturing information further includes date and time data, the date and time data representing a date and time at which the image data is captured.

7. The device according to claim 6, wherein the designated image-capturing information designated from among the plurality of pieces of image-capturing information stored in the first includes date and time data corresponding to a designated period.

8. The device according to claim 6, wherein:
the hardware processor is further configured to:
  obtain first image-capturing information and second image-capturing information of the plurality of pieces of image-capturing information stored in the first database, the first image-capturing information and the second image-capturing information including the image data obtained by capturing a same object at different dates and times, and
  compare the image data included in the first image-capturing information with the image data included in the second image-capturing information to generate changed-region information, the changed-region information representing a region of the object in which a state changes, and
the hardware processor is configured to display, on the display device, the image data included in the first image-capturing information or the second image-capturing information, and display the changed-region information in association with a region of the image data in which the state of the object changes.

9. The device according to claim 8, wherein the hardware processor is configured to:
perform viewpoint conversion processing on at least one of image data included in the first image-capturing information and image data included in the second image-capturing information to convert the at least one of the image data included in the first image-capturing information and the image data included in the second image-capturing information to correspond to a state where the image data included in the first image-capturing information and the image data included in the second image-capturing information are captured at a same image-capturing position and a same image-capturing orientation; and
generate the changed-region information by comparing the image data included in the first image-capturing information with the image data included in the second image-capturing information after conversion to correspond to the state where the image data included in the first image-capturing information and the image data included in the second image-capturing information are captured at the same image-capturing position and the same image-capturing orientation.

10. The device according to claim 6, wherein:
the hardware processor is further configured to:
  obtain first image-capturing information and second image-capturing information from among the plurality of pieces of image-capturing information stored in the first database, the first image-capturing information and the second image-capturing information including the image data obtained by capturing a same object at different dates and times; and
  compare the depth data included in the first image-capturing information with the depth data included in the second image-capturing information to generate changed-region information, the changed-region information representing a region of the object in which a state changes, and
the hardware processor is configured to display, on the display device, image data included in the first image-capturing information or the second image-capturing information, and display the changed-region information in association with a region of the image data in which the state of the object changes.

11. The device according to claim 10, wherein the hardware processor is configured to:
perform viewpoint conversion processing on at least one of depth data included in the first image-capturing information and depth data included in the second image-capturing information to convert the at least one of the depth data included in the first image-capturing information and the depth data included in the second image-capturing information to correspond to a state where the depth data included in the first image-capturing information and the depth data included in the second image-capturing information are captured at a same image-capturing position and a same image-capturing orientation, and
generate the changed-region information by comparing the depth data included in the first image-capturing information with the depth data included in the second image-capturing information after conversion to correspond to the state where the depth data included in the first image-capturing information and the depth data included in the second image-capturing information are captured at the same image-capturing position and the same image-capturing orientation.

12. The device according to claim 8, wherein the hardware processor is configured to further calculate a size of the region of the object in which the state changes.

13. The device according to claim 8, wherein:
the hardware processor is further configured to recognize a nature of a state in the region of the object in which the state changes, and
the hardware processor is configured to display a result of recognition of the nature of the state, in association with the region of the image data in which the state of the object changes.

14. An information processing device comprising:
a hardware processor configured to:
obtain target image data;
estimate, based on the target image data, target position data, the target position data representing an image-capturing position at which the target image data is captured;
estimate, based on the target image data, target depth data, the target depth data representing a distance to an object from the image-capturing position represented by the target position data, and the target depth data being estimated based on at least one of an intensity of blurring of the target image data, a context of the target image data, a disparity estimated using a stereo camera, and data measured using laser irradiation, wherein the target depth data is estimated from the target image data using a model that is trained through machine learning, and wherein the intensity of blurring is associated with the distance to the object; and
display, on a display device, map data representing a map of an environment in which the target image data is captured,
wherein:
the hardware processor is configured to receive designation of one of obtained information and one of a plurality of pieces of image-capturing information that are generated in advance,
the obtained information includes the target image data, the target position data, and the target depth data,
each of the plurality of pieces of image-capturing information includes image data, position data, and depth data, the position data representing an image-capturing position at which the image data is captured, and the depth data representing a distance to an object from the image-capturing position represented by the position data, and
the hardware processor is configured to:
when the obtained information is designated, display at least one of the target image data and the target depth data in association with a pixel position in the map data, the pixel position corresponding to the target position data; and
when the one of the plurality of pieces of image-capturing information is designated, display at least one of image data and depth data in association with a pixel position in the map data, the pixel position corresponding to the position data.

15. An information processing method executed by an information processing device, the information processing method comprising:
managing a first database that stores therein a plurality of pieces of image-capturing information, each of the plurality of pieces of image-capturing information including image data, position data, and depth data, the position data representing an image-capturing position at which the image data is captured, and the depth data representing a distance to an object from the image-capturing position represented by the position data;
obtaining target image data;
estimating, based on the target image data, target position data, the target position data representing an image-capturing position at which the target image data is captured;
estimating, based on the target image data, target depth data, the target depth data representing a distance to an object from the image-capturing position represented by the target position data, and the target depth data being estimated based on at least one of an intensity of blurring of the target image data, a context of the target image data, a disparity estimated using a stereo camera, and data measured using laser irradiation, wherein the target depth data is estimated from the target image data using a model that is trained through machine learning, and wherein the intensity of blurring is associated with the distance to the object;
registering new image-capturing information including the target image data, the target position data, and the target depth data in the first database;
displaying, on a display device, map data representing a map of an environment in which the image data is captured; and
displaying at least one of the image data and the depth data in association with a pixel position in the map data, the image data and the depth data being included in designated image-capturing information, the designated image-capturing information being designated from among the plurality of pieces of image-capturing information stored in the first database, and the pixel position corresponding to the position data included in the designated image-capturing information.

16. A computer program product comprising a non-transitory computer readable medium including programmed instructions, the instructions being executable to control a computer to execute processes comprising:
managing a first database that stores therein a plurality of pieces of image-capturing information, each of the plurality of pieces of image-capturing information including image data, position data, and depth data, the position data representing an image-capturing position at which the image data is captured, and the depth data representing a distance to an object from the image-capturing position represented by the position data;

obtaining target image data;

estimating, based on the target image data, target position data, the target position data representing an image-capturing position at which the target image data is captured;

estimating, based on the target image data, target depth data, the target depth data representing a distance to an object from the image-capturing position represented by the target position data, and the target depth data being estimated based on at least one of an intensity of blurring of the target image data, a context of the target image data, a disparity estimated using a stereo camera, and data measured using laser irradiation, wherein the target depth data is estimated from the target image data using a model that is trained through machine learning, and wherein the intensity of blurring is associated with the distance to the object;

registering new image-capturing information including the target image data, the target position data, and the target depth data, in the first database;

displaying, on a display device, map data representing a map of an environment in which the image data is captured; and displaying at least one of the image data and the depth data in association with a pixel position in the map data, the image data and the depth data being included in designated image-capturing information, the designated image-capturing information being designated from among the plurality of pieces of image-capturing information stored in the first database, and the pixel position corresponding to the position data included in the designated image-capturing information.

* * * * *